United States Patent
Lindvall

(10) Patent No.: US 9,010,275 B2
(45) Date of Patent: Apr. 21, 2015

(54) ANIMAL KEEPING INSTALLATION

(71) Applicant: Tommy Lindvall, Visby (SE)

(72) Inventor: Tommy Lindvall, Visby (SE)

(73) Assignee: Tommy Lindvall, Visby (SE)

( * ) Notice: Subject to any disclaimer, the term of this patent is extended or adjusted under 35 U.S.C. 154(b) by 0 days.

(21) Appl. No.: 14/347,878

(22) PCT Filed: Oct. 1, 2012

(86) PCT No.: PCT/SE2012/051046
§ 371 (c)(1),
(2) Date: Mar. 27, 2014

(87) PCT Pub. No.: WO2013/048333
PCT Pub. Date: Apr. 4, 2013

(65) Prior Publication Data
US 2014/0230749 A1    Aug. 21, 2014

(30) Foreign Application Priority Data
Sep. 29, 2011   (SE) ........................ 1150898

(51) Int. Cl.
*A01K 1/01*    (2006.01)
*A01K 15/02*   (2006.01)

(52) U.S. Cl.
CPC ............. *A01K 1/0135* (2013.01); *A01K 15/027* (2013.01); *A01K 1/0117* (2013.01)

(58) Field of Classification Search
CPC ............................... A01K 15/027; A63B 22/02
USPC .......... 198/632, 812, 813; 119/164, 447, 451, 119/525
See application file for complete search history.

(56) References Cited

U.S. PATENT DOCUMENTS

| 3,694,068 | A | * | 9/1972 | Jordan .......................... 474/106 |
| 4,047,452 | A |   | 9/1977 | Eddy |
| 4,974,831 | A | * | 12/1990 | Dunham ......................... 482/54 |
| 4,984,810 | A | * | 1/1991 | Stearns et al. .................. 482/54 |
| 5,184,988 | A | * | 2/1993 | Dunham ......................... 482/54 |

(Continued)

FOREIGN PATENT DOCUMENTS

| EP | 1466651 A1 | 10/2004 |
| WO | WO 2010/057238 A2 | 5/2010 |

OTHER PUBLICATIONS

International Preliminary Report on Patentability for PCT Application No. PCT/SE2012/051046, dated Apr. 1, 2014, 5 pages.
International Search Report and Written Opinion regarding PCT/SE2012/051046, mail date Jan. 4, 2013, 11 pages.

*Primary Examiner* — Rob Swiatek
*Assistant Examiner* — Danielle Clerkley
(74) *Attorney, Agent, or Firm* — Foley & Lardner LLP

(57) ABSTRACT

Animal keeping installation comprising a floor (11) provided with a mat (12) on which the animal treads when setting foot on the floor (11) and which mat (12) is arranged to be intermittently propelled by a drive roll (13) placed internally in relation to the mat (12), wherein the drive roll (13) is connected to and mounted in bearing journals (15) for rotation about its center axis in a pendulum (14) which allows the drive roll (13), on the one hand, to bear against the inner side of the mat (12) and, on the other hand, to be released from the said bearing contact in dependence on the position of the pendulum (14), and wherein the drive roll (13) is connected to a drive member (18, 19, 51, 62) for driving the roll (13) at least into a position where the drive roll (13) bears against the mat (12).

20 Claims, 2 Drawing Sheets

(56) References Cited

U.S. PATENT DOCUMENTS

| | | |
|---|---|---|
| 6,237,536 B1 | 5/2001 | Lindvall et al. |
| 7,051,680 B2 | 5/2006 | Lindvall |
| 7,287,641 B2 | 10/2007 | Lindvall |
| 7,507,187 B2 * | 3/2009 | Dyer et al. ............ 482/54 |

* cited by examiner

ANIMAL KEEPING INSTALLATION

CROSS-REFERENCE TO RELATED PATENT APPLICATIONS

This application claims the benefit of priority of International Application No. PCT/SE2012/051046, filed on Oct. 1, 2012, which is hereby incorporated by reference in its entirety.

TECHNICAL FIELD

The present invention relates to an animal keeping installation comprising a floor which comprises a preferably endless mat, which mat is intermittently driven in one direction in order, for example, to remove droppings from the floor and apply bedding and/or fodder to the same.

BACKGROUND TO THE INVENTION

The background to the invention can be seen from Swedish patent application SE 0100830-9 with publication number SE 520871, with equivalence in U.S. Pat. No. 7,051,680. This publication shows an animal keeping installation having a floor, a tending device and a drive device for the tending device. The drive device acts upon the floor, which is driven by an animal, through movement, subjecting the floor to a dynamic load which causes an energy-absorbing device to absorb energy, which is later released and produces driving of the floor.

The said publication shows in one embodiment an energy storage through tensioning of a helical spring, which stored energy is used to drive a drive roll.

In another shown embodiment in this publication another type of energy storage in the form of a weight is shown, the potential energy of which is stored until an energy extraction is made and the potential energy is discharged so as to be stored again.

Further embodiments for energy storage comprising spring, tension cord and pendulum are indicated in the said publication.

Many of these drive devices require that the drive roll is connected to a ratchet wheel in the storage of energy, which ratchet wheel is released and driving of the floor is able to be initiated.

Each of these energy storage principles with drive devices requires a realized construction which is not shown in this publication. The construction can be realized in many different ways, but has proved difficult to realize in a simple, functionally reliable and cost-effective manner.

One problem is that the driving of the endless mat of the floor tends to skew the mat in relation to the drive roll, which means that the mat slides against mountings and bearings, which causes the mat to be torn to pieces and results in operating disturbances and breakdowns.

OBJECT OF THE INVENTION

The object of the present invention is to provide a new type of drive device which, in a simple, functionally reliable and cost-effective manner, solves the propulsion problems for a matted floor of an animal keeping installation.

The object is also to enable the mat of the floor to be centred in order to avoid operating disturbances.

SUMMARY OF THE INVENTION

The above-stated objects are met by virtue of the present invention as it appears in the independent patent claim, wherein the said drawbacks have been eliminated. Suitable embodiments of the invention are defined in the dependent patent claims.

The invention relates to an animal keeping installation comprising a floor provided with a mat on which the animal treads when setting foot on the floor. The mat is arranged to be intermittently propelled by a drive roll placed internally in relation to the mat. The drive roll is connected to, preferably suspended in, a pendulum and mounted in the latter in bearing journals for rotation about its centre axis. The pendulum allows the drive roll, on the one hand, to bear against the inner side of the mat and, on the other hand, to be released from the said bearing contact in dependence on the position of the pendulum. In addition, the drive roll is connected to a drive member for driving the drive roll at least into a position where the drive roll bears against the mat. The bearing contact of the drive roll against the mat is dependent only on the position of the pendulum. This means that the intermittent operation is determined firstly by the position of the pendulum and secondly by the drive member of the drive roll. The realization of an intermittent operation makes it possible to correct the mat in relation to the drive roll when the latter is not bearing against the mat. The mat according to this embodiment can be configured by a piece which partially covers the floor surface and which also extends around at least the drive roll. In order to hold together the ends of the mat, one or more belt(s) can be connected between the ends of the mat. For example, such a mat can be fed forward and back in order to be cleaned on a specific region.

In one embodiment of the invention, the mat is of endless configuration. An endless mat has the advantage that it has no connections for belts and can be fed freely around the whole of the floor in order to be cleaned in full.

In one embodiment of the invention, the drive member comprises an energy-absorbing element connected between the floor and a base plate, so that a tilting motion of the floor charges the said element when an animal treads on the floor or its drive end and that an opposite tilting motion discharges the said element when the animal is removed from the floor or its drive end; a drive journal rigidly connected to the centre axis of the drive roll; a drive cable extending between the base plate and a cable arm, the cable being wound around and fixed to the said drive journal situated between the base plate and the cable arm, wherein the said tilting motion releases the drive roll from the mat, and wherein the said opposite tilting motion effects a driving of the mat by rotating the drive roll via the drive journal and the drive cable. This embodiment constitutes a simple solution to the control of the pendulum in combination with the driving of the drive roll, which pendulum is controlled only by the treading of the floor by an animal. The energy-absorbing element is preferably constituted by a gas spring, but mechanical springs, too, are conceivable.

According to a further embodiment, the point of connection of the drive cable to the base plate is situated farther out from the drive journal than the point of connection of the drive cable to the cable arm for a specific position of the pendulum. Such positioning of the points of connection to the drive cable provides suitable control of the pendulum for the drive roll.

In a further embodiment of the invention, the drive cable connects to the periphery of the drive journal which is facing towards the driven side of the floor, for the extension of the drive cable from both the base plate and the cable arm. This way of connecting the drive cable to the drive journal results in the desired driving direction of the drive roll. An opposite winding of the drive cable around the drive journal for an opposite driving direction is also conceivable.

According to a further embodiment of the invention, the drive member comprises a drive journal rigidly connected to the centre axis of the drive roll; a drive cable, which is reeled around the drive journal and which can be drawn out in the direction away from the drive journal and thereby rotate the same and, at the same time, bring the drive roll to bear against the mat; a control apparatus, which can draw the drive cable out in the direction away from the drive journal; an energy-absorbing element connected between the floor and the drive cable, which element is charged when the drive cable is drawn out from the drive journal by means of the control apparatus and discharged when the drive cable is released and thus retracted. In this embodiment, a control lever can be force-actuated in the direction of pull, whilst the energy-absorbing element, for example a spring, retracts the drive cable for reeling around the drive journal.

According to a further embodiment of the invention, the drive member comprises a drive journal rigidly connected to the centre axis of the drive roll; a drive cable, which is reeled around the drive journal and which can be drawn out in the direction away from the drive journal and thereby rotate the same and, at the same time, bring the drive roll to bear against the mat; a first deflection pulley mounted on the floor and around which runs the drive cable from the drive journal; a second deflection pulley mounted on the opposite side of the drive journal and around which runs the drive cable; and a control apparatus is connected to the drive cable in order to draw the cable back and forth over the deflection pulleys. The embodiment makes it possible to intermittently drive the mat, with, for example, just a lever as the control apparatus, by moving the lever back and forth, possibly repeatedly for a lengthy feed section.

In these embodiments, the drive cable can be drawn out from the drive journal with a controlled motor or cylinder, which is also controlled to make the drive cable return to the rest position. In this way, the intermittent operation is programmed and made fully automated.

According to a further embodiment, the drive member comprises a motor connected to the drive roll for rotation of the same; a pendulum apparatus, which acts directly upon the pendulum to bring the drive roll either into engagement or out of engagement with the mat, wherein the motor drives the drive roll at least when the drive roll is in bearing contact with the mat. This embodiment allows a horizontal floor but requires controlling of both the pendulum motion and the driving of the drive roll, and can be programmed and made fully automated.

In one embodiment, the pendulum apparatus is constituted by a hydraulic cylinder. The pendulum apparatus can also be constituted by a linear motor or the like.

The common link for all embodiments is that the drive roll is suspended in a pendulum, so that an intermittent operation can be effected in dependence on the position of the pendulum and can thus permit an automatic adjustment of the position of the mat on the drive roll in the rest periods.

Embodiments are also conceivable in which the pendulum with the drive roll is mounted at different fastening angles, for example the pendulum can be directed upwards instead of, as in the shown illustrative embodiments, downwards.

For all embodiments, the motion of the pendulum is kept relatively small, so that the gap between the surface of the roll and the surface of the mat lies within the range 3-10 mm, preferably 5-8 mm. In order to limit the motion of the pendulum, adjusting screws or stop pins can be disposed in slots adjacent to the pendulum and the floor.

BRIEF DESCRIPTION OF THE DRAWINGS

The invention will now be described in greater detail with references in connection with the appended drawing figures.

The drawing figures show only basic diagrams intended to facilitate understanding of the invention.

DESCRIPTION OF THE INVENTION

Figure 1:
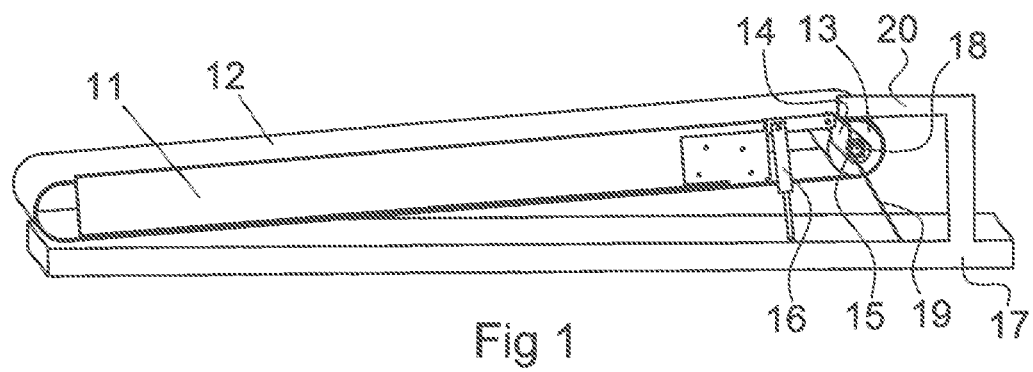
FIG. 1 shows a first embodiment of the invention in a first position.

FIG. 1 shows a floor 11 belonging to an animal keeping installation. The floor comprises an endless mat 12, which is intermittently movable in order to transport away animal droppings and possibly also supply bedding to the floor. To the floor can be connected various scraping members for cleaning the mat, though these are not shown in the figures. The mat is also supported on its bottom side by load supports (not shown). One end of the floor is provided with a drive roll 13 inside the mat, which drive roll drives the mat when it bears against the inner side of the mat. The drive roll is suspended in a pendulum 14 and is mounted in this in a bearing journal 15 for rotation about the centre axis of the drive roll. This means that when the pendulum is swung outwards, the surface of the drive roll bears against the inner side of the mat and can drive the same if the drive roll is set in rotation. In the shown first position, the floor is inclined by virtue of the fact that an energy-absorbing element 16 is connected between the floor 11 and a base plate 17 in an upper tension-relieved position. The floor can here realize a tilting motion down into a substantially horizontal position, whereupon the said element 16 is charged, for example when an animal treads on the floor. An opposite tilting motion discharges the said element 16 when the load is removed from the floor. In addition, the drive roll is provided with a drive journal 18 fixedly connected to and arranged concentrically with the bearing journal 15. Around the drive journal 18 is wound and fixed a drive cable 19. The drive cable is anchored, on the one hand, in the base plate 17 and, on the other hand, in a cable arm 20 connected to the base plate and situated above the drive journal 18.

Figure 2:
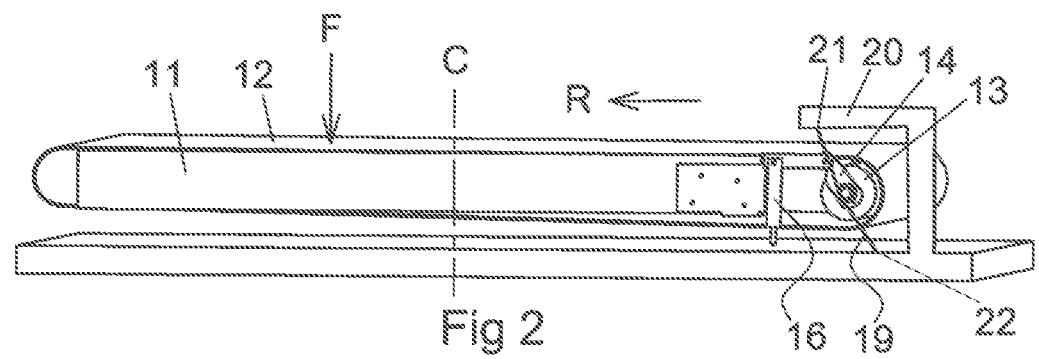
FIG. 2 shows the embodiment according to FIG. 1 in a second position.

FIG. 2 shows the second position of the floor 11, that is to say once it has been subjected to a force F, so that it has been tilted into a substantially level position, wherein the energy-absorbing element 16 has been charged and the pendulum 14, through the action of the drive cable 19, has temporarily swung the drive roll 13 away from engagement with the inner side of the mat 12, as can be seen from the figure by the representation of a gap between the drive roll and the mat. When the force F is removed from the floor 11, the stored energy in the element 16 is released, whereupon the floor is pressed back into the position shown in FIG. 1. Immediately upon the return motion of the floor, the cable will force the pendulum 14 out towards the mat by the edge of the floor and, as a result of this pendulum motion, the drive roll 13 enters into engagement with the inner side of the mat. Upon a continued angular motion of the floor 11, the drive cable 19 will force the drive roll 13 into rotation, whereupon it drives the mat in its rotational direction R, shown with the direction of the arrow. The motion of the mat continues until the floor 11 has assumed the position shown in FIG. 1, whereupon the described course of movements can be repeated again. For satisfactory working of the described driving with the drive cable, its upper point of attachment 21 to the cable arm 20 in a vertical position is situated at a horizontally closer distance to the centre C of the floor than the lower point of attachment 22 of the drive cable, the vertical position of which, in relation to the upper point of attachment of the drive cable, is situated at a horizontally farther distance from the centre C of the floor.

Figure 3:
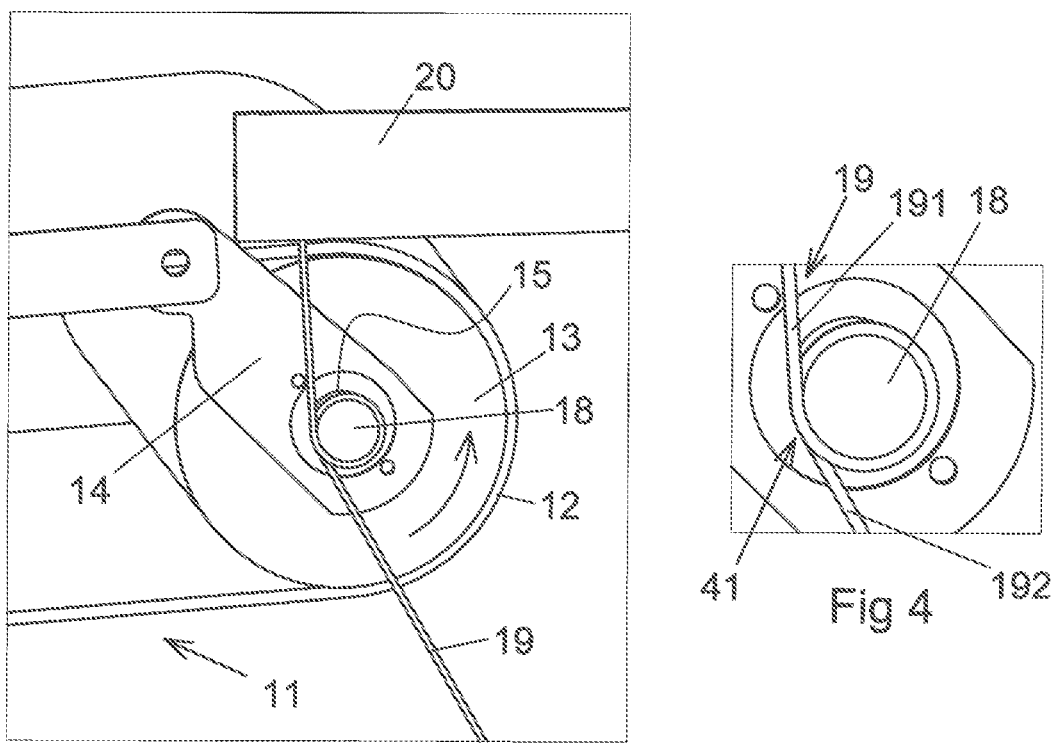
FIG. 3 shows an enlargement of the embodiment according to FIG. 1.

FIG. 3 shows an enlarged image of the driven end of the floor 11 when the floor is in its upper position, as shown in FIG. 1. The pendulum 14, which by means of bearings supports the drive roll 13 rotatably about the bearing journals 15, is in its outermost position, wherein the drive roll bears against the inner side of the mat 12 and can thus drive the same. The drive cable 19 is wound around the drive journal 18, so that the drive roll 13 rotates in the direction of the arrow and thereby drives the mat 12 when the floor 11 moves in the upward direction, that is to say when the drive journal 18 moves towards the cable arm 20.

Figure 4:
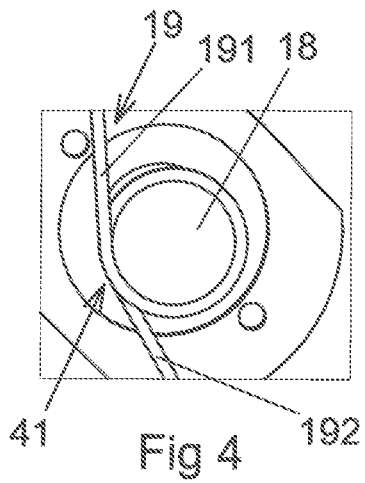
FIG. 4 shows a detailed enlargement from FIG. 3.

FIG. 4 shows a further enlarged view from FIG. 3, in which the drive cable 19 has been wound around the drive journal 18 in such a way that winding on and unwinding of the drive cable 19 is effected from that side of the drive journal 18 which is facing in towards the floor, namely the winding side 41 of the drive journal. Preferably, the drive cable 19 is divided into an upper, first cable part 191 and a lower, second cable part 192, so that the first cable part 191 is wound by ½-3½ turns around the cable journal, with its end, moreover, being fixedly connected on the drive journal. Correspondingly, the second cable part 192 is wound by ½-3½ turns around the cable journal, with its end, too, being fixedly connected on the drive journal. Depending on the desired transmission of the drive motion and the driven length of the belt in each operating cycle, the number of winding turns can be still more.

In the shown embodiment a drive cable has been shown, but other flexible non-elastic drive members can also be used, for example rope, chain, wire or pull cable. Combinations of these can also be used.

Figure 5:
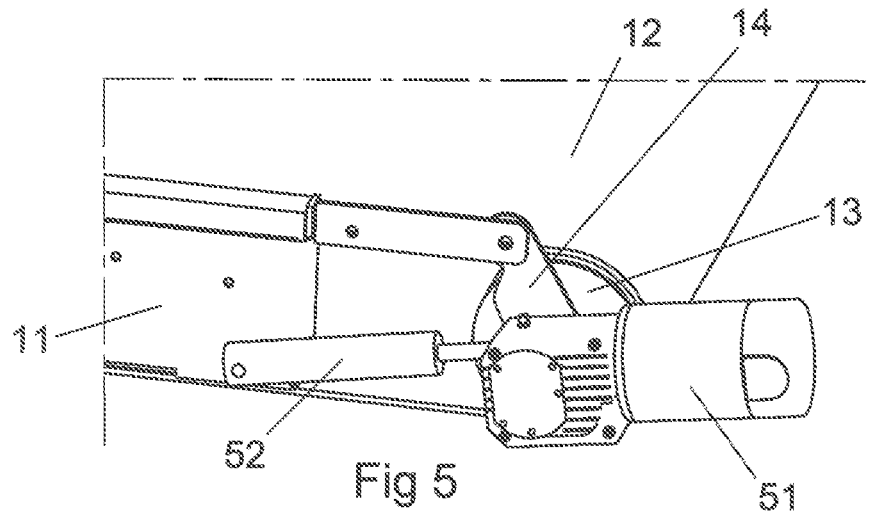
FIG. 5 shows a second embodiment of the invention.

FIG. 5 shows a second embodiment of the invention. In this embodiment, the floor 11 of the animal keeping installation is constantly horizontally orientated. The floor 11 according to this embodiment is provided with an endless mat 12, which at one end of the floor runs around a drive roll 13. The drive roll is rotatably mounted and suspended in a pendulum 14, so that the drive roll can assume an active driving position when it engages against the inner side of the mat and an inactive operating position when the pendulum swings the roll away from the engagement. For driving the drive roll 13, a drive motor 51 is mounted at the pendulum 14, which drive motor can be driven continuously or controlled intermittently for driving of the drive roll in those positions where the drive roll bears against the mat 12. In addition, a hydraulic cylinder, such as a pendulum drive member 52, is controlled to actuate the movement of the pendulum 14 between a drive position and a rest position. The controlling of the hydraulic cylinder can be programmed by control members (not shown). Also the controlling of the drive motor 51 in intermittent operation is synchronized with the controlling of the hydraulic cylinder. The embodiment according to FIG. 5 is thus also suited to being intermittently driven by the drive roll 13. Alternative pendulum drive members are also conceivable, for example in the form of a manual actuation of the pendulum in order to connect the drive roll to the mat for driving in combination with a spring or counterweight which returns the pendulum to the rest position. A modified embodiment of the pendulum drive member in the form of one or two gas/air/liquid cylinders which pull the pendulum in both directions is also conceivable within the scope of the invention. Alternatively, a throttle motor can act as the pendulum drive member.

Figure 6:
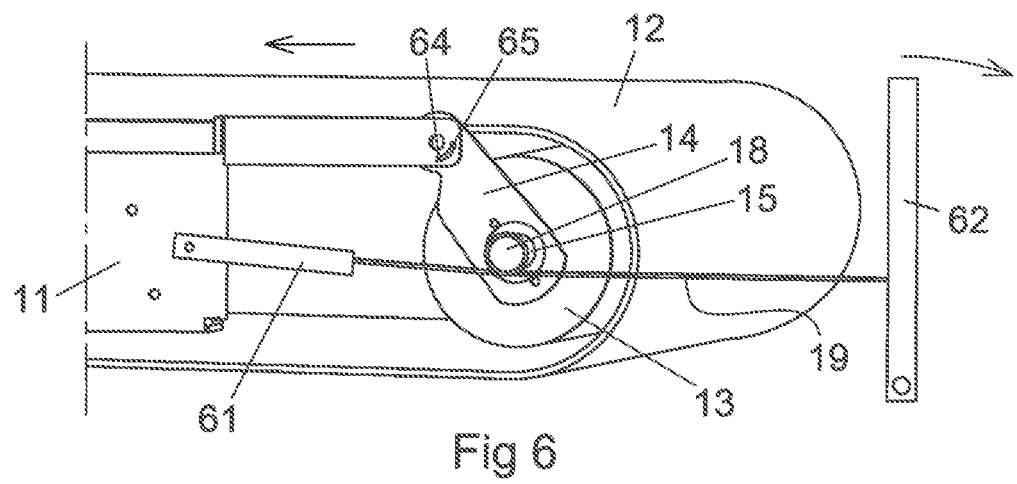
FIG. 6 shows a third embodiment of the invention.

FIG. 6 shows a further embodiment of the invention, in which the floor 11 with its endless mat 12 is held horizontally in the same way as the floor in the embodiment shown in FIG. 5. The drive roll 13 is suspended by means of bearings in a pendulum 14 rotatably fixed in the floor 11, in a corresponding manner to that shown in FIGS. 1-5. Between a drive cable 19, which is reeled around a drive journal 18, and the floor 11 is connected a spring member 61, which exerts a force upon the cable and thus the pendulum, which force is intended to displace the pendulum and thus the drive roll 13 away from bearing contact against the inner side of the mat 12. The spring member 61 thus causes a gap to be formed between the drive roll and the mat when the spring member is in its rest position. In a similar manner to that shown in the first embodiment, the drive journal 18 is fixedly connected to the bearing journal 15 of the drive roll 13 for rotation about the centre axis of the drive roll. The drive cable 19 is thus wound around the drive journal 18. In a corresponding manner to that shown in FIG. 4, the drive cable can consist of two parts, the one ends of which are fixedly connected to the bearing journal. The drive cable is also connected to a control apparatus 62, wherein cable and control apparatus are supported by supporting devices (not shown). In the figure, the control apparatus is shown as a lever which can be pivoted about a bearing in the direction of the arrow in order to activate the movement of the mat 12. The drive cable is wound onto the bearing journal so that an unreeling of the cable by pulling on the control apparatus in the direction of the arrow effects a rotation of the drive roll and a driving of the mat to the left in the figure, that is to say in the direction of the arrow, by virtue of the fact that the pendulum with the drive roll swings out from the floor towards the inner side of the mat and comes to bear against the same. When the control apparatus is released, the pendulum, by dint of the action of the spring member 61 upon the cable, will be swung back, whereupon the drive roll releases its grip against the mat. At the same time, the cable 19, by virtue of the spring member 61, will reverse-rotate the drive roll and thereby reel the drive cable 19 of the control apparatus, that is to say that part of the drive cable which is directly acted upon by the control apparatus, back onto the drive journal 18. The figure also shows a possible solution for limiting the movement of the pendulum by positioning on the floor 11 a slot 65, in which a stop pin 64 mounted in a suitable position on the pendulum 14 moves towards the end edge of the slot and thereby stops further movement of the pendulum. Other devices for limiting the pendulum movement can be adjusting screws or stop lugs.

Figure 7:
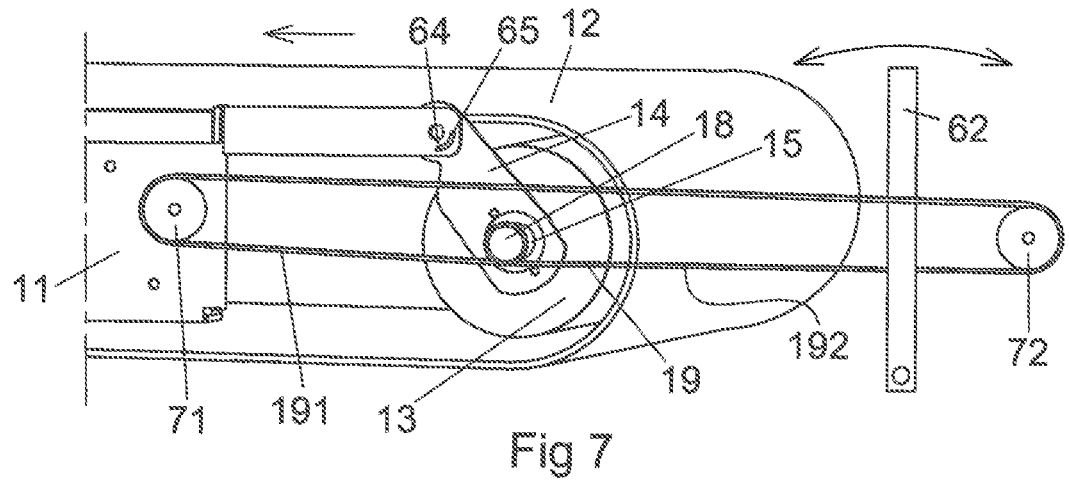
FIG. 7 shows a fourth embodiment of the invention.

FIG. 7 shows a further embodiment of the invention, in which the floor 11 with its endless mat 12 is held horizontally in the same way as the floor in the embodiment shown in FIG. 5. The drive roll 13 is suspended by means of bearings in a pendulum 14 rotatably fixed in the floor 11, in a corresponding manner to that shown in FIGS. 1-6. A drive cable 19 is reeled around a drive journal 18 and is connected to a control apparatus 62. The drive cable 19 runs onward from the drive journal 18 towards the floor 11 and runs around a first deflection pulley 71 mounted on the floor. The drive cable runs onward from the first deflection pulley 71 to a second deflection pulley 72 mounted on the opposite side of the drive journal 18 in relation to the first deflection pulley 71. From the second deflection pulley 72, the drive cable 18 runs to the control apparatus 62. In a similar manner to that shown in the first embodiment, the drive journal 18 is fixedly connected to the bearing journal 15 of the drive roll 13 for rotation about the centre axis of the drive roll. The drive cable 19 is thus wound around the drive journal 18. This embodiment allows the control apparatus to pull the drive cable in both directions, but with operation of the mat when the control apparatus is moved to the right in the figure. In a corresponding manner to that shown in FIG. 4, the drive cable can consist of two parts 191, 192, the one ends of which are fixedly connected to the bearing journal. The second deflection pulley 72 of the drive cable and the control apparatus are supported by supporting devices (not shown). In the figure, the control apparatus is shown as a lever which can be pivoted about a bearing in the direction of the arrow in order to activate the movement of the mat 12. The drive cable is wound onto the bearing journal so that an unreeling of the cable by pulling on the control apparatus in the direction of the arrow effects a rotation of the drive roll and a driving of the mat to the left in the figure, that is to say in the direction of the arrow, by virtue of the fact that the pendulum with the drive roll swings out from the floor towards the inner side of the mat and comes to bear against the same. When the control apparatus is moved in the opposite direction, the pendulum will be swung back, whereupon the drive roll releases its grip against the mat. At the same time, the drive cable 19 will reverse-rotate the drive roll and thereby reel the drive cable 19 of the control apparatus, that is to say that part of the drive cable 192 which is directly acted upon by the control apparatus, back onto the drive journal 18. The figure also shows a possible solution for limiting the movement of the pendulum by positioning on the floor 11 a slot 65, in which a stop pin 64 mounted in a suitable position on the pendulum 14 moves towards the end edge of the slot and thereby stops further pendulum movement. Other devices for limiting the pendulum movement can be adjusting screws or stop lugs.

The principle for driving the drive roll 13 with a cable shown in FIGS. 6 and 7 is the same as previously described in connection with FIGS. 3 and 4. The drive direction of the drive roll in the shown embodiments can be oppositely directed by virtue of the fact that the winding of the drive cable onto the drive journal is effected from the other side of the drive journal. The fastening of the drive cable or drive belt to the drive journal can be realized in a number of ways, for example by inserting a loop/fold into a slot in the drive journal and locking this loop/fold with a stop screw or stop wedge from the outer side of the journal.

In all embodiments, the mat of the floor will move to the left in the figures and will preferably pass through a scrape-off apparatus (not shown), in which excrement and used bedding will be removed, whereupon the mat is rid of this contamination when it comes back up onto the top side of the floor. In addition, a spreader (not shown) is arranged to apportion bedding onto the scraped end of the mat in order to make the mat attractive again for an animal.

In all embodiments, an intermittent driving of the mat of the floor is obtained, so that the drive roll, in a non-driving position, has removed itself from the inner surface of the mat and thereby enables automatic correction of the side position of the mat in relation to the drive roll.

In order to obtain a good connection between the outer surface of the drive roll and the inner surface of the mat, in the shown embodiments different surface structures of the drive roll and the mat can be tailored to one another.

The floor in the shown embodiments is provided with supporting elements (not shown), situated beneath the mat, in order to absorb the loads which arise when an animal treads on the floor.

The figures have shown embodiments in which the mounting of the roll and the drive devices are situated on a single side of the drive roll, but the other side of the drive roll is also provided with a corresponding mounting. In such an embodiment, the pendulum drive members which drive the pendulums of both sides can be connected in series in order to obtain an even pressure between the drive roll and the mat and thus reduce the risk of skewing of the mat. The pendulum drive members can in this case be constituted by gas or liquid cylinders and can act as communicating vessels, so that they always generate an equal pressure on the respective side of the drive roll.

The driving of the drive roll can also be doubled, that is to say be arranged at both ends of the roll.

The animal keeping installation is also provided with enclosures, side arrangements and mounting devices for the floor, which have not been shown in order to increase the clarity of the present invention.

The invention claimed is:

1. An animal keeping installation comprising:
   a floor provided with a mat on which an animal treads when setting foot on the floor and which mat is arranged to be intermittently propelled by a drive roll placed internally in relation to the mat;
   wherein the drive roll is connected to and mounted in bearing journals for rotation about its center axis and suspended by a pendulum which allows the drive roll, on the one hand, to bear against an inner side of the mat and, on the other hand, be released from contact of the drive roll against the inner side of the mat in dependence on a position of the pendulum, and in that the drive roll is connected to a drive member for driving the roll at least into a position where the drive roll bears against the mat.

2. The animal keeping installation of claim 1, wherein the mat is of endless configuration.

3. The animal keeping installation of claim 1, wherein the drive member comprises:
   an energy-absorbing element connected between the floor and a base plate, so that a tilting motion of the floor charges the said element when an animal treads on the floor or its driven end and that an opposite tilting motion discharges the said element when the animal is removed from the floor or its driven end;
   a drive journal rigidly connected to the center axis of the drive roll;
   a drive cable extending between the base plate and a cable arm, the cable being wound around and fixed to the said drive journal situated between the base plate and the cable arm,
   wherein the said tilting motion releases the drive roll from the mat, and wherein the said opposite tilting motion effects a driving of the mat by rotating the drive roll via the drive journal and the drive cable.

4. The animal keeping installation of claim 3, wherein a point of connection of the drive cable to the base plate is situated farther out from the drive journal than a point of connection of the drive cable to the cable arm for a specific position of the pendulum.

5. The animal keeping installation of claim 4, wherein the drive cable connects to a winding side of the drive journal which is facing towards a side of the floor, for the extension of the drive cable from both the base plate and the cable arm.

6. The animal keeping installation of claim 1, wherein the drive member comprises:
   a drive journal rigidly connected to the center axis of the drive roll;
   a drive cable, which is reeled around the drive journal and which can be drawn out in a direction away from the drive journal and thereby rotate the same and at the same time bring the drive roll to bear against the mat;
   a control apparatus, which can draw the drive cable out in the direction away from the drive journal;

an energy-absorbing element connected between the floor and the drive cable, which element is charged when the drive cable is drawn out from the drive journal by means of the control apparatus and discharged when the drive cable is released and thus retracted.

7. The animal keeping installation of claim 1, wherein the drive member comprises:
a drive journal rigidly connected to the center axis of the drive roll;
a drive cable, which is reeled around the drive journal and which can be drawn out in a direction away from the drive journal and thereby rotate the same and, at the same time, bring the drive roll to bear against the mat;
a first deflection pulley mounted on the floor and around which runs the drive cable from the drive journal;
a second deflection pulley mounted on an opposite side of the drive journal relative the first deflection pulley and around which runs the drive cable;
and in that a control apparatus is connected to the drive cable in order to draw the drive cable back and forth over the deflection pulleys.

8. The animal keeping installation of claim 1, wherein the drive member comprises:
a motor connected to the drive roll for rotation of the same; and
a pendulum apparatus connected between the pendulum and the floor and which acts directly upon the pendulum to bring the drive roll either into engagement or out of engagement with the mat,
wherein the motor drives the drive roll at least when the drive roll is in bearing contact with the mat.

9. The animal keeping installation of claim 8, wherein the pendulum apparatus includes a hydraulic cylinder.

10. The animal keeping installation of claim 1, wherein the drive roll is suspended in a hanging pendulum.

11. An animal keeping installation, comprising:
a floor provided with a mat on which an animal treads when setting foot on the floor and which mat is arranged to be intermittently propelled by a drive roll placed internally in relation to the mat;
wherein the drive roll is connected to and mounted in bearing journals for rotation about its center axis and suspended by a pendulum which allows the drive roll, on the one hand, to bear against an inner side of the mat and, on the other hand, be released from contact of the drive roll against the inner side of mat in dependence on a position of the pendulum, and in that the drive roll is connected to a drive member for driving the roll at least into a position where the drive roll bears against the mat; and
wherein the drive member comprises:
an energy-absorbing element connected between the floor and a base plate, so that a tilting motion of the floor charges the said element when an animal treads on the floor or its driven end and that an opposite tilting motion discharges the said element when the animal is removed from the floor or its driven end;
a drive journal rigidly connected to the center axis of the drive roll;
a drive cable extending between the base plate and a cable arm, the cable being wound around and fixed to the said drive journal situated between the base plate and the cable arm; and
wherein the said tilting motion releases the drive roll from the mat, and wherein the said opposite tilting motion effects a driving of the mat by rotating the drive roll via the drive journal and the drive cable.

12. The animal keeping installation of claim 11, wherein the mat is of endless configuration.

13. The animal keeping installation of claim 11, wherein a point of connection of the drive cable to the base plate is situated farther out from the drive journal than a point of connection of the drive cable to the cable arm for a specific position of the pendulum.

14. The animal keeping installation of claim 11, wherein the drive cable connects to a winding side of the drive journal which is facing towards a side of the floor, for the extension of the drive cable from both the base plate and the cable arm.

15. The animal keeping installation of claim 11, wherein the drive roll is suspended in a hanging pendulum.

16. An animal keeping installation, comprising:
a floor provided with a mat on which an animal treads when setting foot on the floor and which mat is arranged to be intermittently propelled by a drive roll placed internally in relation to the mat;
wherein the drive roll is connected to and mounted in bearing journals for rotation about its center axis and suspended by a pendulum which allows the drive roll, on the one hand, to bear against an inner side of the mat and, on the other hand, be released from contact of the drive roll against the inner side of mat in dependence on a position of the pendulum, and in that the drive roll is connected to a drive member for driving the roll at least into a position where the drive roll bears against the mat; and
wherein the drive member comprises:
a drive journal rigidly connected to the center axis of the drive roll;
a drive cable, which is reeled around the drive journal and which can be drawn out in a direction away from the drive journal and thereby rotate the same and at the same time bring the drive roll to bear against the mat;
a control apparatus, which can draw the drive cable out in the direction away from the drive journal; and
an energy-absorbing element connected between the floor and the drive cable, which element is charged when the drive cable is drawn out from the drive journal by means of the control apparatus and discharged when the drive cable is released and thus retracted.

17. The animal keeping installation of claim 16, wherein the mat is of endless configuration.

18. The animal keeping installation of claim 16, wherein the drive roll is suspended in a hanging pendulum.

19. The animal keeping installation of claim 16, wherein the drive member further comprises:
a first deflection pulley mounted on the floor and around which runs the drive cable from the drive journal; and
a second deflection pulley mounted on an opposite side of the drive journal relative the first deflection pulley and around which runs the drive cable;
wherein the control apparatus is connected to the drive cable in order to draw the drive cable back and forth over the deflection pulleys.

20. The animal keeping installation of claim 16, wherein the drive member further comprises:
a motor connected to the drive roll for rotation of the same; and
a pendulum apparatus connected between the pendulum and the floor and which acts directly upon the pendulum to bring the drive roll either into engagement or out of engagement with the mat;
wherein the motor drives the drive roll at least when the drive roll is in bearing contact with the mat.

* * * * *